US007707113B1

(12) United States Patent
DiMartino et al.

(10) Patent No.: US 7,707,113 B1
(45) Date of Patent: Apr. 27, 2010

(54) METHOD AND SYSTEM FOR SETTING LEVELS OF ELECTRONIC WALLET SECURITY

(75) Inventors: Allison DiMartino, Overland Park, KS (US); Robert H. Miller, Leawood, KS (US); Elizabeth Roche, Prairie Village, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/863,632

(22) Filed: Sep. 28, 2007

(51) Int. Cl.
G06Q 40/00 (2006.01)
(52) U.S. Cl. .......................................... 705/44; 705/41
(58) Field of Classification Search .................. 705/44, 705/41
See application file for complete search history.

(56) References Cited

U.S. PATENT DOCUMENTS

| 7,146,159 | B1 | 12/2006 | Zhu |
| 7,413,113 | B1 | 8/2008 | Zhu |
| 7,434,723 | B1 | 10/2008 | White et al. |
| 7,494,067 | B1 | 2/2009 | Zhu |
| 2001/0005184 | A1 | 6/2001 | Tsuno et al. |
| 2002/0011519 | A1 | 1/2002 | Shults, III |
| 2002/0062284 | A1* | 5/2002 | Kawan .......................... 705/43 |
| 2002/0123971 | A1* | 9/2002 | Maritzen et al. ............... 705/64 |
| 2002/0147913 | A1* | 10/2002 | Lun Yip ........................ 713/184 |
| 2003/0009382 | A1* | 1/2003 | D'Arbeloff et al. ............ 705/17 |
| 2003/0028481 | A1* | 2/2003 | Flitcroft et al. ................ 705/39 |
| 2004/0093265 | A1 | 5/2004 | Ramchandani et al. |
| 2005/0216424 | A1* | 9/2005 | Gandre et al. .................. 705/75 |
| 2006/0136334 | A1* | 6/2006 | Atkinson et al. ............... 705/40 |
| 2006/0167823 | A1* | 7/2006 | York et al. ..................... 705/76 |
| 2006/0191995 | A1 | 8/2006 | Stewart et al. |
| 2007/0198410 | A1 | 8/2007 | Labgold et al. |
| 2007/0233615 | A1* | 10/2007 | Tumminaro .................... 705/75 |
| 2007/0244811 | A1* | 10/2007 | Tumminaro .................... 705/39 |
| 2007/0255620 | A1* | 11/2007 | Tumminaro et al. ............ 705/14 |
| 2007/0255652 | A1* | 11/2007 | Tumminaro et al. ............ 705/39 |
| 2007/0291995 | A1 | 12/2007 | Rivera |
| 2008/0126260 | A1 | 5/2008 | Cox et al. |

OTHER PUBLICATIONS

Office Action dated Jun. 17, 2009, U.S. Appl. No. 11/949,759, filed Dec. 3, 2007, 6 pages.
Office Action dated Feb. 17, 2009, U.S. Appl. No. 11/863,229, filed Sep. 27, 2007, 14 pages.
Office Action dated Nov. 13, 2009, U.S. Appl. No. 11/949,759 filed on Dec. 3, 2007, 19 pages, IDF 4856 (4000-64400).

* cited by examiner

*Primary Examiner*—James Kramer
*Assistant Examiner*—Lindsay M. Maguire

(57) ABSTRACT

A method of a portable electronic device providing payment from an electronic wallet is provided. The method comprises prompting for input of a personal identification number (PIN) after the wallet has been opened and providing payment from the wallet after receiving the PIN, when the wallet is configured to a first level of security. The method also comprises providing payment from the wallet after the wallet has been opened, when the wallet is configured to a second level of wallet security, wherein the PIN is not contemporaneously input. The method also comprises providing payment from the wallet when the electronic portable device has been activated, when the wallet is configured to a third level of wallet security, wherein the wallet is not opened and the PIN is not contemporaneously input.

14 Claims, 8 Drawing Sheets

METHOD AND SYSTEM FOR SETTING LEVELS OF ELECTRONIC WALLET SECURITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A variety of alternatives to using cash may be used for paying for goods and services. Credit cards, debit cards, and smart cards may be used to pay for grocery purchases, retail purchases, gasoline purchases, restaurant purchases, etc. Transit cards may be used to purchase a ride on a mass transportation vehicle such as a bus or a subway train. Toll payment devices, sometimes referred to as toll tags, may be used to pay toll without stopping or slowing down at a toll booth, and/or pay for parking fees at airports. The ease with which these payment cards may be stolen and used for purchases of goods and services by someone other than the card holder or authorized proxies of the card holder, which may also be referred to as identity theft, makes payment card security an important subject. Various procedures for preventing improper use of these payment cards have evolved including requiring photo identification of the card holder, entry of a personal identification number (PIN), entry of the zip code of the billing address of the payment card holder, etc. To some extent, increased payment security to complete a payment transaction may consume more time of the user, may distract the user from an on-going social engagement with companions, and may cause embarrassment to the user, for example when the user cannot remember the PIN of the credit card and has to request another to pick-up the tab at a restaurant.

A portable electronic device may include an electronic wallet application, also referred to as an eWallet, that provides a variety of financial and payment capabilities. The electronic wallet application supports paying for products or services with the device in much the same way as presenting a credit card, a debit card, a smart card, a transit card, or a toll tag for payment. The portable electronic device may communicate with a point-of-sale (POS) terminal using contactless communication means, for example near field communication (NFC) technology, to provide the appropriate financial information to complete a payment transaction.

SUMMARY

In an embodiment, a method of a portable electronic device providing payment from an electronic wallet is provided. The method comprises prompting for input of a personal identification number (PIN) after the wallet has been opened and providing payment from the wallet after receiving the PIN, when the wallet is configured to a first level of security. The method also comprises providing payment from the wallet after the wallet has been opened, when the wallet is configured to a second level of wallet security, and the PIN is not contemporaneously input. The method also comprises providing payment from the wallet when the electronic portable device has been activated, when the wallet is configured to a third level of wallet security, and the wallet is not opened and the PIN is not contemporaneously input.

In an embodiment, a portable electronic device is disclosed. The portable electronic device comprises a contactless communication interface configured to transmit payment information to a point-of-sale (POS) terminal to complete a payment transaction, an input component configured to receive control inputs, and a processor. The processor is configured to execute instructions of an electronic wallet application. When configured to a third level of electronic wallet security, the processor promotes sending payment information to the POS terminal via the contactless communication interface when the portable electronic device is in an active state, with no contemporaneous PIN entry needed and the electronic wallet need not be launched. When configured to a second level of electronic wallet security, the processor promotes sending payment information to the POS terminal via the contactless communication interface when the electronic wallet is launched, with no contemporaneous PIN entry needed. When configured to a first level of electronic wallet security, the processor sends payment information to the POS terminal via the contactless communication interface when the electronic wallet is launched and the PIN is contemporaneously provided by the input component.

In an embodiment, a method of completing a payment transaction using an electronic wallet is disclosed. When the electronic wallet is configured to a first level of wallet security, the method comprises prompting for input of a PIN, and receiving a PIN input, and providing payment information to complete the payment transaction after receiving the PIN input. When the electronic wallet is configured to the second level of wallet security, the method comprises launching the electronic wallet and providing payment information when the electronic wallet is launched without contemporaneously receiving the PIN input. When the electronic wallet is configured to the third level of wallet security, the method comprises providing payment information when the electronic wallet is not launched and without contemporaneously receiving the PIN input.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
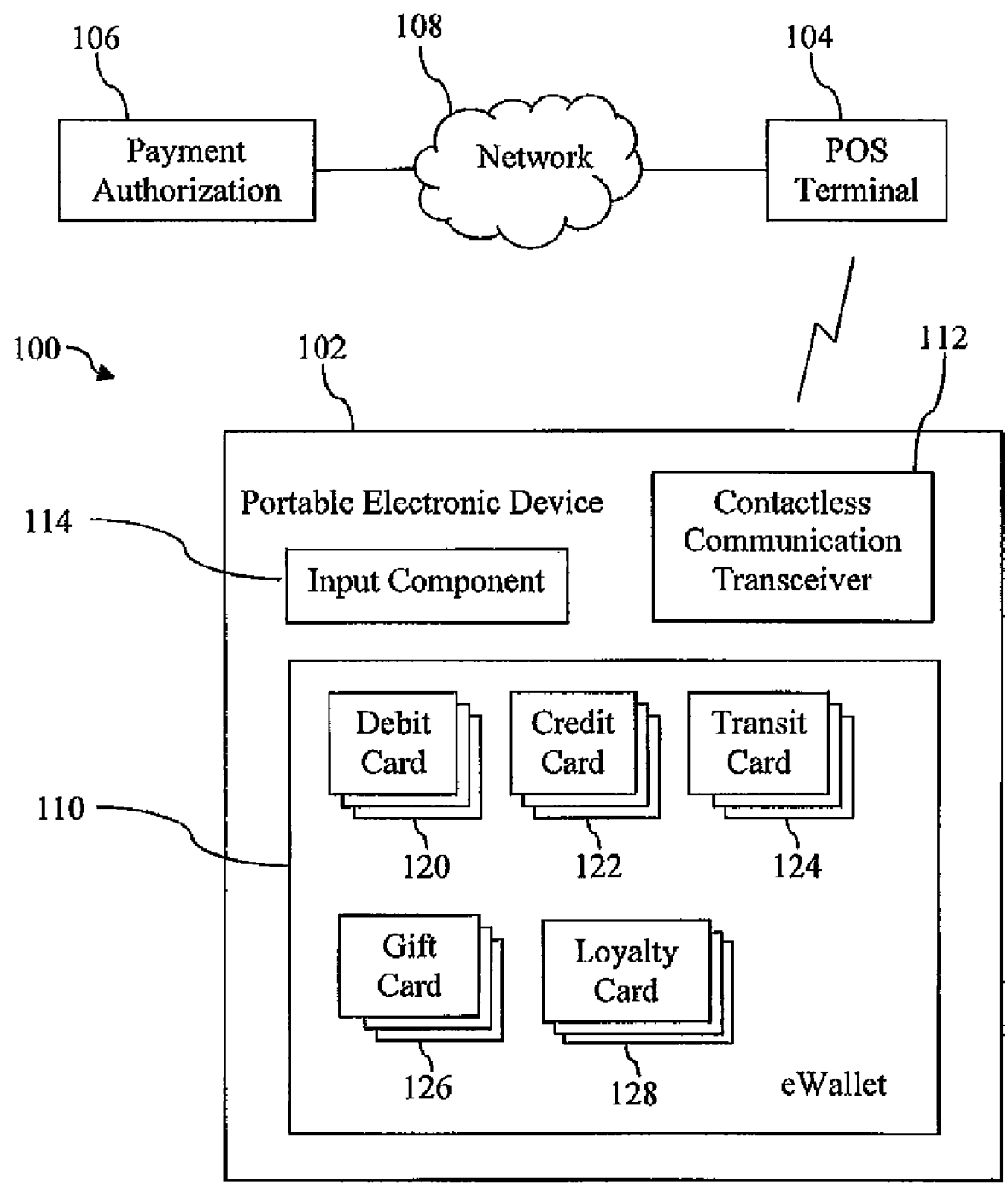
FIG. 1 is an illustration of a payment transaction system according to one or more embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The level of electronic wallet security procedures applied to using payment cards in an electronic wallet may be tailored to the comfort level and familiarity with use of the electronic wallet of the electronic wallet user. When an electronic wallet is first initialized and a payment card is first added to the electronic wallet, the default procedure is to trigger payment upon the user opening the electronic wallet and providing a personal identification number (PIN). This default payment procedure may be referred to as a first level of electronic wallet security. In one embodiment, the PIN is associated with the electronic wallet itself, and opening the electronic wallet may be contingent on first providing the PIN. In another embodiment, the PIN is associated with one or more payment cards contained by the electronic wallet, and the electronic wallet may first be launched without providing the PIN until the user desires to complete a payment transaction using a PIN protected card. As the electronic wallet user becomes more comfortable with using the electronic wallet, the electronic wallet may be reconfigured to permit payment with one or more payment cards without providing the PIN, as long as the electronic wallet is opened or launched, thereby lowering the level of effort for the electronic wallet user to complete a payment transaction. This payment procedure may be referred to as a second level of electronic wallet security. With still more experience and familiarity, the electronic wallet user may choose to reconfigure the electronic wallet to allow payment with a selected card without providing the PIN and without opening the electronic wallet, as long as the portable electronic device is active or "awake." This payment procedure may be referred to as a third level of electronic wallet security. In an embodiment, when the electronic wallet is configured in the third level of electronic security, it may be possible to allow payment with a selected card even when the portable electronic device is not active, without providing the PIN and without opening the electronic wallet. Thus, as the user proceeds from the first level to the second level to the third level of electronic wallet security the payment procedures become streamlined and more convenient. The user may trade off the level of security for the level of ease of use.

Adding a payment card to the electronic wallet may launch a set up interface, also referred to as a set up wizard. In an embodiment, the set up interface may be context sensitive and provide a different set of dialog boxes depending upon the current level of electronic wallet security of the electronic wallet. For example, when the electronic wallet is configured to the first level of electronic wallet security, the user may be prompted to choose for the electronic wallet to remember the PIN associated with the payment card being initialized in the electronic wallet and present a checkbox for "remember PIN" which is unchecked.

When the electronic wallet is configured to the second level of electronic wallet security, the user may not be prompted to choose for the electronic wallet to remember the PIN associated with the payment card being initialized. Instead, the set up interface assumes the user, having previously set up a payment card with the remember PIN option active, no longer wants to expend the effort of entering the PIN to complete payment transactions and the card is automatically set up to remember the PIN. The user may override the remember PIN option for the card, but extra steps may be involved. For the second level of electronic wallet security, the user may be prompted to choose to pay with the card without opening the wallet, also referred to as selecting the card always on.

When the electronic wallet is configured to the third level of electronic wallet security, the user may not be prompted to choose for the electronic wallet to remember the PIN associated with the payment card being initialized. Instead, the set up interface assumes the user, having previously set up a payment card with the remember PIN option active, no longer wants to expend the effort of entering the PIN to complete payment transactions and the card is automatically set up to remember the PIN. For the third level of electronic wallet security, the user may not be prompted to choose to make the card always on, because the user has already designated an always on card. In an embodiment, the electronic wallet may promote configuring a maximum of one payment card to be always on. In another embodiment, the electronic wallet may promote configuring a maximum of one payment card to be always on from each payment card category, for example one credit card, one debit card, and one transit card. In yet another embodiment, there may be no limit on the number of transit cards which may be concurrently configured to be always on. Thus, as a user moves from the first level to the second level to the third level of wallet security the card set up interface becomes more streamlined and convenient.

Turning now to FIG. 1, a system 100 for completing payment transactions according to an embodiment of this disclosure is discussed. The system 100 comprises a portable electronic device 102, a point-of-sale (POS) terminal 104, a payment authorization center 106, and a network 108. A payment for a product or service may be made electronically by the device 102 through contactless communication with the POS terminal 104, for example by communicating payment information such as a credit card or a transit card account number. For purposes of the present disclosure, contactless communication is intended to include a wide variety of communication means including near field communication (NFC) technology, infra-red, ultra-sonic, optical, radio frequency, wireless, Bluetooth, Wi-Fi, and other communication links that do not involve direct physical contact. In an embodiment, the POS terminal 104 completes the payment transaction by handshaking with the payment authorization center 106, communicating with the payment authorization center 106 through the network 108. In another embodiment, the POS terminal 104 completes the payment transaction without communicating with the payment authorization center 106.

The POS terminal 104 may be embodied as a general purpose computer system, to be discussed in greater detail hereinafter. The POS terminal 104 communicates via contactless communication with the device 102. The POS terminal 104 may be connected to databases or networked to servers (not shown) which provide product and service pricing information, including any discounting associated with a loyalty card and/or product coupons. In an embodiment, the POS terminal 104 may include a device for scanning a product, for example a bar code reader or radio frequency identification (RFID) reader, to identify a product and to add the associated cost to an accumulating purchase total.

The payment authorization center 106 may authenticate and authorize charges to a credit card such as VISA card, AMERICAN EXPRESS card, MASTERCARD card, DISCOVER card, gasoline company card, or other credit card. The authorization handshake may require transmission of account identification, for example an account number or a credit card number. Additionally, the authorization handshake may require further authentication information such as a personal identification number (PIN), a driver's license number, a security code associated with the credit card, or other authentication information. If the payment authorization center 106 approves the transaction, the payment authorization center 106 charges the appropriate account in the amount of the transaction and sends payment approval. The payment authorization center 106 may be implemented as a general purpose computer system.

The network 108 may be any of a public switched telephone network (PSTN), a public data network (PDN), or a combination thereof.

The portable electronic device 102 may be any of a variety of devices including but not limited to a mobile phone, a personal digital assistant (PDA), a laptop computer, a tablet computer, or other portable electronic device. An exemplary embodiment of a handset suitable to implementing several embodiments of this disclosure, for example a mobile phone and a PDA, is discussed in detail hereinafter.

The device 102 includes one or more applications that provide services and functionality to a user, such as a mobile phone subscriber or a PDA user. These applications may include, but are not limited to, an electronic wallet 110, a mobile phone service, a text message service, an email service, a schedule service, an address book service, a browser service, and others. The device 102 includes a contactless communication transceiver 112 and an input component 114. The contactless communication transceiver 112 may communicate by any of a variety of means including near field communication (NFC) technology, infra-red, ultra-sonic, optical, radio frequency, Bluetooth, Wi-Fi, and other communication links. The input component 114 may be a keypad, a touchscreen, or any other input device. The electronic wallet 110, also referred to as an eWallet, provides a variety of financial and payment capabilities. The electronic wallet 110 supports paying for products or services with the device 102 in much the same way as presenting a credit card, a debit card, or a transit card for payment. In an embodiment, the electronic wallet 110 includes one or more debit cards 120, credit cards 122, transit cards 124, gift cards 126, and loyalty cards 128. In an embodiment, the electronic wallet 110 may also include one or more coupons (not shown) in electronic format. Additionally, the electronic wallet 110 may promote paying from a payment account.

In some embodiments, the method of interacting with the POS terminal 104 is dependent on user states or states of the electronic wallet 110. The states are conditioned on past choices of using the electronic wallet 110. For example, the electronic wallet 110 may offer control shortcuts to the user that, when these shortcuts are selected, cause the state of the electronic wallet 110 to change, from example from a novice user state to a comfortable user state and from a comfortable user state to a veteran user state. Different states correspond to different methods of interacting with the electronic wallet 110 to control payment. Thus, the novice user state may correspond to methods promoting greater security but also involving more involvement and/or attention of the user. The comfortable user state may correspond to methods that provide less security but provide greater convenience. The veteran user state may correspond to yet less security while providing the most convenience. These states may be referred to as different levels of wallet security. The different states allow a user to control their evolution to less automated or mandatory security as their knowledge and comfort with the electronic wallet 110 increases in exchange for greater convenience. The different states are associated with different control paths to complete payment transactions with the POS terminal 104. The user states may also be referred to as security levels.

In some embodiments, card categories may be leveraged at each level or state of security or user familiarity with the use of the electronic wallet 110. The electronic wallet 110 may have different cards or sets of cards configured for use in different payment contexts. Alternatively, the electronic wallet 110 may automatically select an appropriate card based on the payment context. For example, a specific gas card and/or major credit card may be configured for gasoline purchases. When approaching the POS terminal 104 at a gas station, the electronic wallet 110 may select the appropriate gas card for payment. In some embodiments, the states or levels of security may be different for different card categories or card types. For example, an electronic wallet 110 may be operated by a user at a first state or level of security for major credit cards, at a second level of security for debit cards, and at a third level of security for transit cards.

Figure 2:
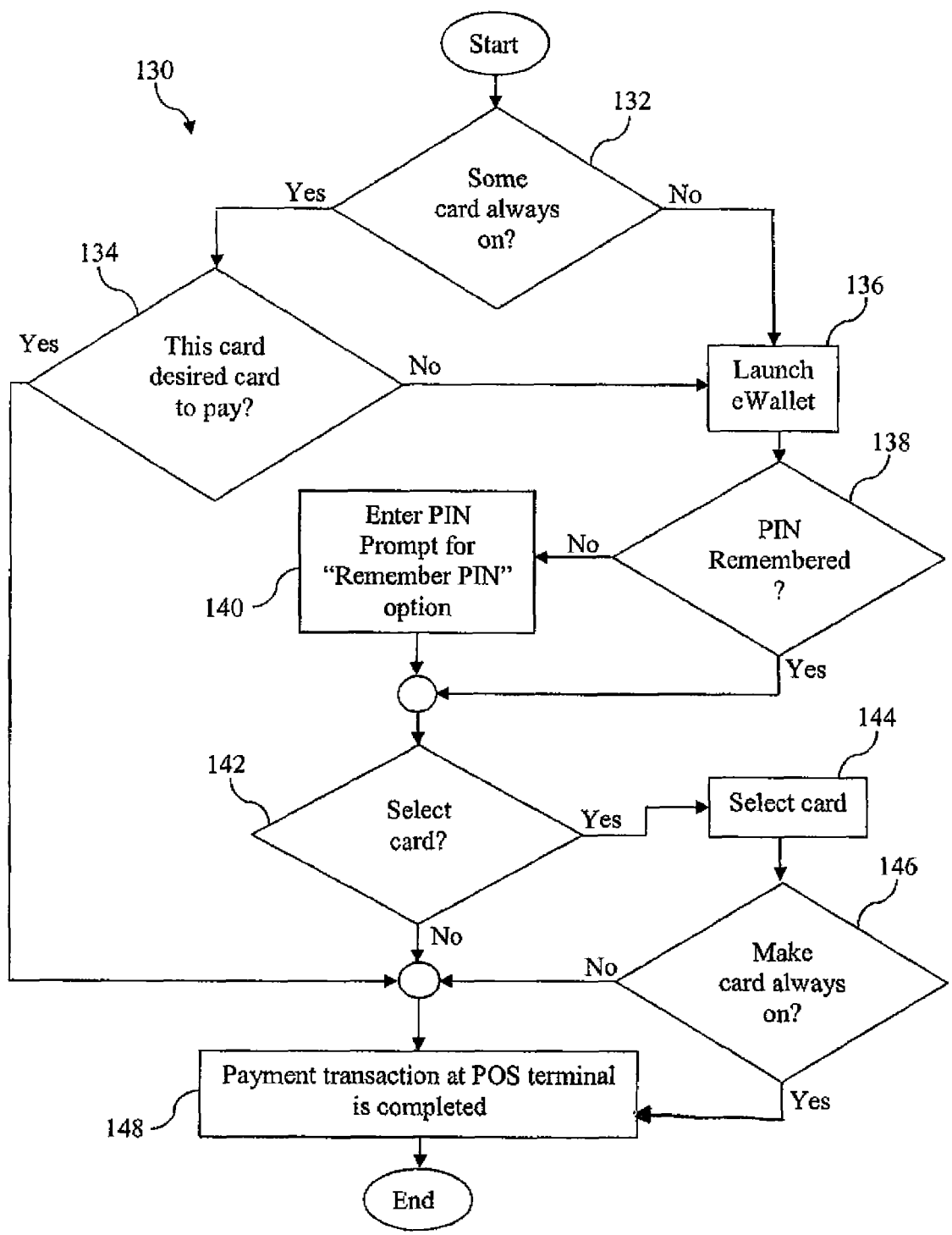
FIG. 2 is flow chart of a method of electronic payment according to an embodiment of the disclosure.

Turning now to FIG. 2, a flow chart of a method 130 for completing a payment transaction using the device 102 is discussed. The method 130 begins when the device 102 approaches the POS terminal 104. At block 132, if an appropriate payment card, for example one of the debit cards 120, the credit cards 122, and the transit cards 124, is not always on, the method 130 proceeds to block 136 where the electronic wallet 110 is launched. In an embodiment, the appropriate payment card is determined based on the purchase context. For example, the electronic wallet 110 may receive information from the POS terminal 104 that identifies the type of payment transaction as a gasoline purchase, a mass transportation ticket purchase, a department store purchase, and other. In an embodiment, the electronic wallet 110 may be launched automatically, for example triggered by the detection of a NFC emission from the POS terminal 104. Alternatively the electronic wallet 110 may be launched by a variety of other methods At block 138 if the electronic wallet 110 is not configured to remember the PIN that protects access to the services and functionality of the electronic wallet 110, the method 130 proceeds to block 140 where the PIN associated with the electronic wallet 110 is entered. In an embodiment, an input to configure the electronic wallet 110 to remember the PIN, and hence to save the step of inputting the PIN, is provided to the user while inputting the PIN. If the user selects the device 102 to remember the PIN, the security level associated with the user or the device 102 may be reconfigured from a first electronic wallet security level to a second electronic wallet security level. In method 130, the PIN protects access to the electronic wallet 110.

At block 142 the user of the device is prompted to select a payment card or use the default payment card, for example one of the debit cards 120, the credit cards 122, and the transit cards 124. In an embodiment, one of each type of payment card types may be configured as a default payment card of that type. If the user chooses to select a payment card, the method 130 proceeds to block 144 in which the user may select a payment card, for example, selecting an appropriate payment card from a list of payment cards displayed in a dialog box.

In an embodiment, when selecting the payment card an input, for example a dialog box, to configure the selected card as always on is provided to the user. The device 102 may provide payment information associated with a card which is always on without opening the electronic wallet 110 and without providing the PIN. Paying without providing the PIN may also be referred to as paying without contemporaneously providing or entering the PIN, based on the consideration that the PIN was at some point in the past provided to or configured into the electronic wallet 110 in order for the electronic wallet 110 to later be configured to remember this same PIN. For example, when paying at a subway turnstile, a user may wave the device 102 close to the POS terminal 104, and the device 102 provides payment information associated with the transit card 124, if the transit card 124 is configured to be always on, without the user opening the electronic wallet 110 or providing the PIN. In another example, when paying at a department store checkout counter, a user may wave the device 102 close to the POS terminal 104, and the device 102 provides payment information associated with the credit card 122, if the credit card 122 is configured to be always on, without the user opening the electronic wallet 110 or providing the PIN. If the user selects the card to be always on, the method 130 completes. Also if the user selects the card to be always on, the security level associated with the user or the device 102 may be reconfigured to a third electronic wallet security level.

At block 142, if the user chooses to use the default payment card, and at block 146, if the user does not make the selected card always on, the method 130 proceeds to block 148 where the payment transaction information associated with the default card is provided to the POS terminal 104 and the payment transaction is completed. If the user chooses at block 146 to make the selected card always on, the method 130 proceeds to block 148 where the payment transaction information associated with the selected card is provided to the POS terminal 104. In another embodiment, after the user makes a card always on the method 130 may allow the user to exit the process without completing the payment transaction.

At block 132, if one of the payment cards is always on, the method 130 proceeds to block 134. At block 134, if the always on card is not the card the user intends to use to complete the payment transaction, the method 130 proceeds to block 136, otherwise the method 130 proceeds to block 148 where the payment transaction information associated with the always on card is provided to the POS terminal 104 and the payment transaction is completed. In an embodiment, the device 102 may provide the user with a dialog box to select a different card to override the always on card, for example to use a different credit card which has a different interest rate. In an embodiment, the device 102 may provide the user with a dialog box for selecting a different default always on card. In an embodiment, the electronic wallet 110 may select the appropriate always on card from among a plurality of always on cards to use to pay to complete the transaction with the POS terminal 104 based on contextual cues, for example a name of a retail business or a category of retail business.

Figure 3A:
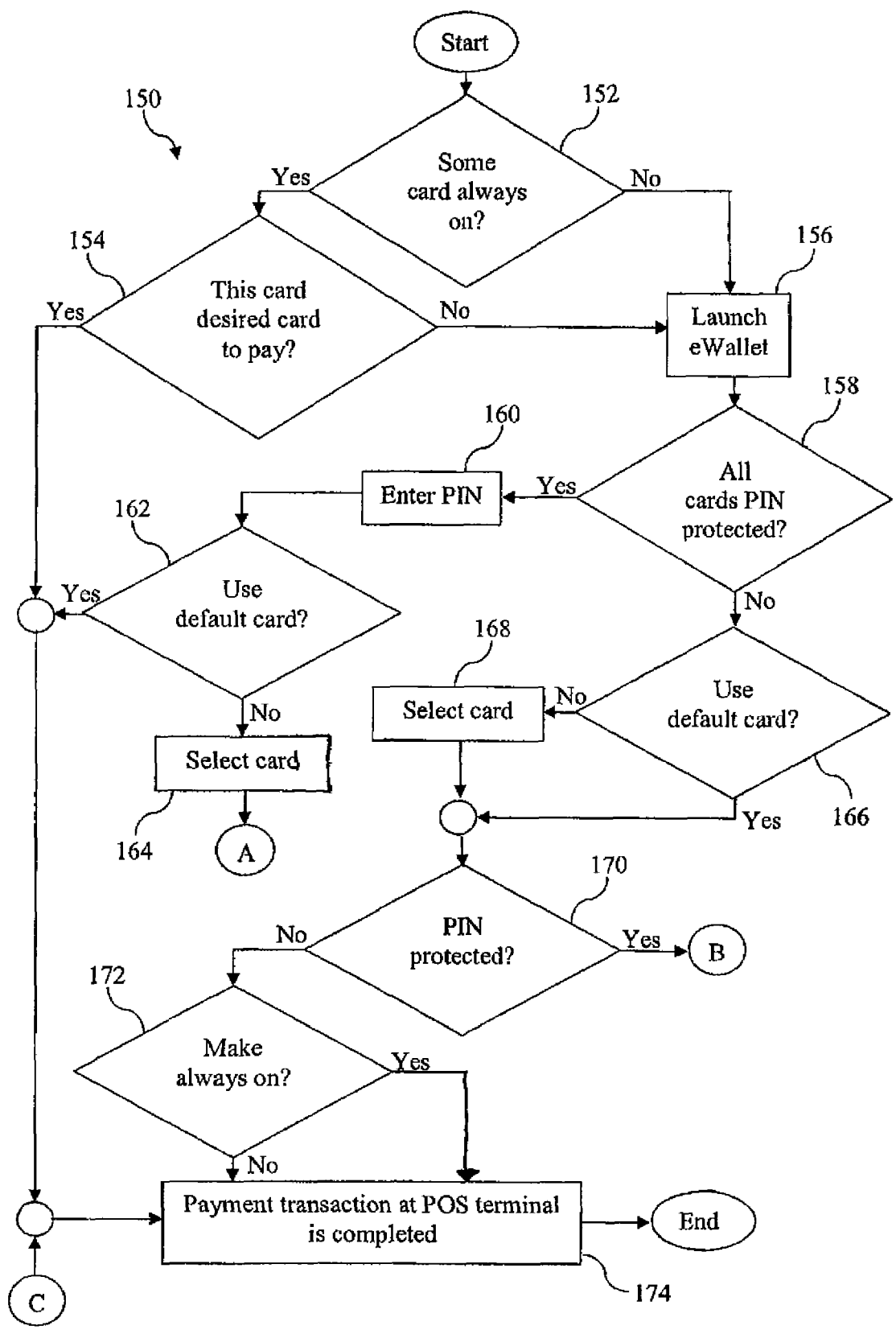
FIG. 3A is a first portion of a flow chart of another method of electronic payment according to an embodiment of the disclosure.
Figure 3B:
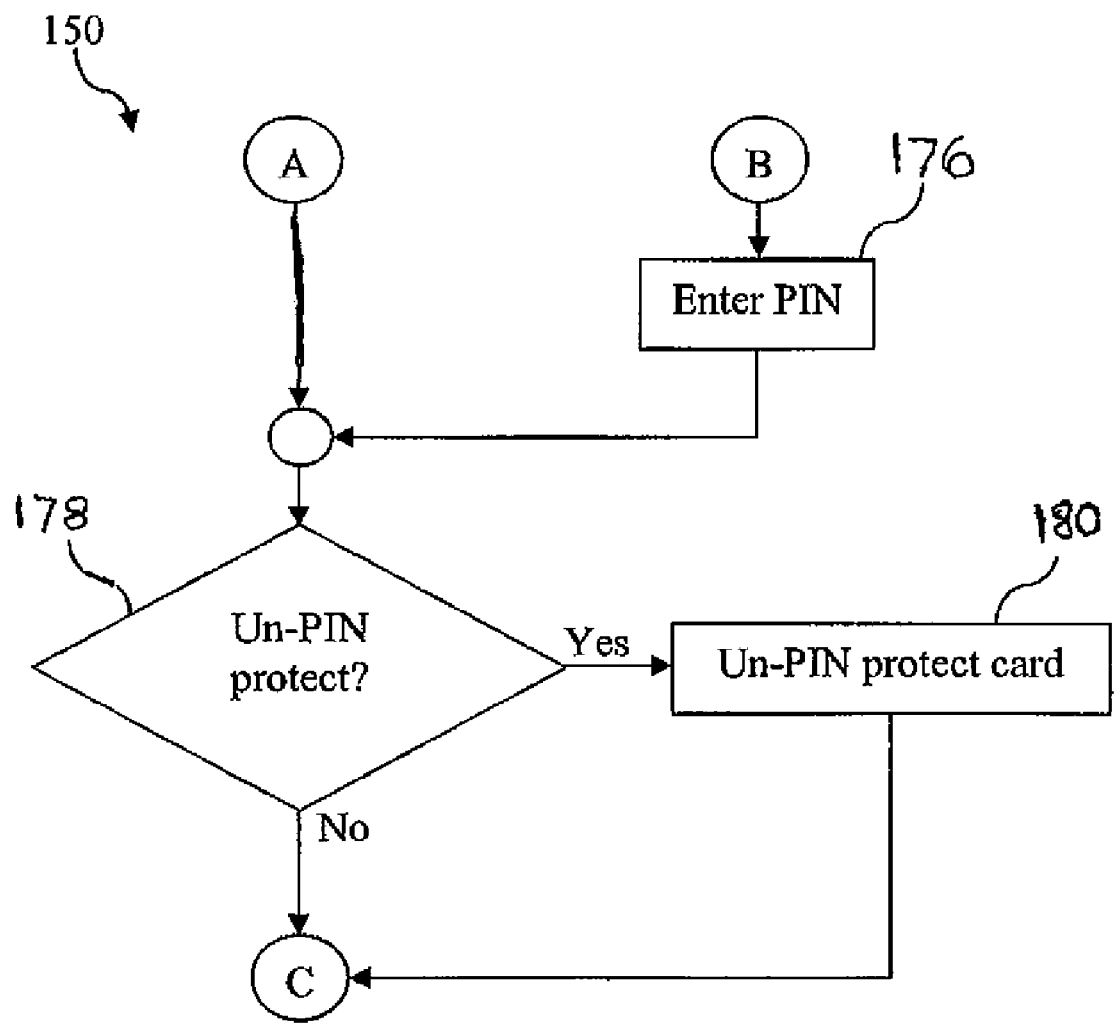
FIG. 3B is a second portion of the flow chart of another method of electronic payment according to an embodiment of the disclosure.

Turning now to FIG. 3A and FIG. 3B, a flow chart of another method 150 for completing a payment transaction using the device 102 is discussed. The method 150 is depicted on two sheets, labeled FIG. 3A and FIG. 3B, to avoid crowding the illustration into a single sheet and to promote ease of reading. The flow connections between FIG. 3A and FIG. 3B are indicated by connection bubbles A, B, and C.

The method 150 begins when the device 102 approaches the POS terminal 104. At block 152, if an appropriate payment card, for example one of the debit cards 120, the credit cards 122, and the transit cards 124, is always on, the method 150 proceeds to block 154. At block 154, if the user wishes to use the card that is selected to be always on to complete the payment transaction, the method 150 proceeds to block 174 where the payment transaction information associated with the always on card is provided to the POS terminal 104 and the payment transaction is completed.

At block 152, if an appropriate payment cards is not selected to be always on, the method 150 proceeds to block 156 where the electronic wallet 110 is launched. At block 154, if the user does not wish to use the card that is selected to be always on to complete the payment transaction, the method 150 proceeds to block 156 where the electronic wallet 110 is launched. In an embodiment, the electronic wallet 110 may be launched automatically, for example triggered by the detection of a NFC emission from the POS terminal 104. Alternatively the electronic wallet 110 may be launched by a variety of other methods.

The method 150 proceeds to block 158 where if all payment cards are PIN protected, the method 150 proceeds to block 160 where the PIN is entered. The method 150 proceeds to block 162 where if the user wishes to use the configured default payment card to complete the payment transaction, the method 150 proceeds to block 174. If the user wishes to use a payment card other than the default payment card, the method 150 proceeds to block 164 where the user selects the payment card for completing the payment transaction. The method 150 proceeds to block 178 in FIG. 3B where if the user chooses to remove PIN protection for the selected payment card the method 150 proceeds to block 180. At block 180 the selected payment card is configured to not require entry of the PIN, for example by selecting a "remember PIN" box in a dialog box. This may be referred to as un-PIN protecting the payment card. When the user selects the remember PIN mode for the selected payment card, the security level associated with the user or the device 102 may be reconfigured from a first electronic wallet security level to a second electronic wallet security level. The process 150 proceeds to block 174 on FIG. 3A where the payment transaction is completed using the information associated with the selected payment card at the POS terminal 104.

In block 158, if not all payment cards are PIN protected, the process 150 proceeds to block 166. In block 166, if the user chooses to use the default payment card, the process 150 proceeds to block 170, otherwise at block 168 the user selects the payment card for completing the payment transaction.

At block 170, if the payment card is PIN protected, the process 150 proceeds to block 176 on FIG. 3B where the PIN is entered. The method 150 proceeds to block 178 in FIG. 3B where if the user chooses to remove PIN protection for the selected payment card the method 150 proceeds to block 180. At block 180 the selected payment card is configured to not require entry of the PIN, for example by selecting a "remember PIN" box in a dialog box. When the user selects the remember PIN mode for the selected payment card, the security level associated with the user or the device 102 may be reconfigured from a first electronic wallet security level to a second electronic wallet security level. The process 150 proceeds to block 174 on FIG. 3A where the payment transaction is completed using the information associated with the selected payment card at the POS terminal 104.

If at block 170 the payment card is not PIN protected, the user is prompted to make the payment card always on. At block 172 if the user chooses to make the payment card always on, the process 150 proceeds to block 174 where the payment transaction is completed using the information associated with the selected payment card at the POS terminal 104. In another embodiment, after making the payment card always on, the user may be able to exit the process 150 without completing the payment transaction. Also if the user selects the payment card to be always on, the security level associated with the user or the device 102 may be reconfigured to a third electronic wallet security level. At block 172 if the user chooses to not make the payment card always on, the process 150 proceeds to block 174 where the payment transaction is completed using the information associated with the selected payment card at the POS terminal 104.

Figure 4:
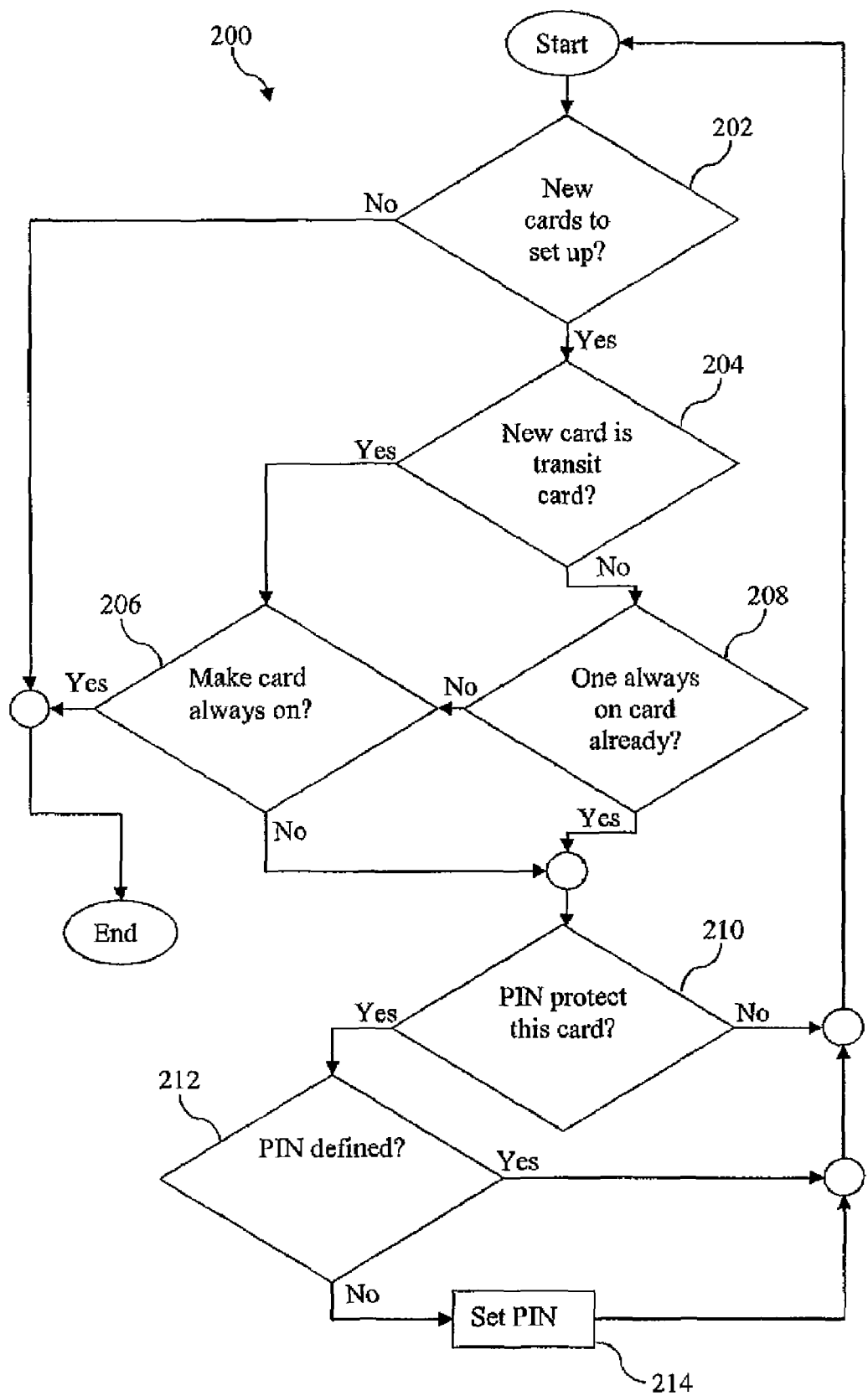
FIG. 4 is a flow chart of a method of payment card set up according to an embodiment of the disclosure.

Turning now to FIG. 4, a method 200 for configuring a payment card, for example one or more of the debit cards 120, the credit cards 122, and the transit cards 124, is discussed. At block 202 if there are any new payment cards to be set up, the method 200 proceeds to block 204. In block 204, if the new card is not a transit card, the method 200 proceeds to block 208. In block 208, if one payment card is always on, the method 200 proceeds to block 210.

In block 210, if the user does not want to PIN protect the card, the method 200 proceeds to block 202. When the user does not want to PIN protect the card and selects the remember PIN mode for the card, the security level associated with the user or the device 102 may be reconfigured from a first electronic wallet security level to a second electronic wallet security level. In block 210, if the user wants to PIN protect the payment card, the method 200 proceeds to block 212. In block 212 if the PIN is already defined, the method 200 returns to block 202. In block 212, if the PIN is not yet defined the method 200 proceeds to block 214 where the user defines a PIN. From block 214, the method 200 returns to block 202.

In block 204, if the new card is a transit card, the method 200 proceeds to block 206. In an embodiment, new transit cards are configured to be always on. In block 206, if the user configures the transit card to be always on, the method 200 exits, otherwise the method 200 proceeds to block 210.

In block 208, if no card is configured to always on, the method 200 proceeds to block 206. In block 206, if the user configures the card to be always on, the method 200 exits, otherwise the method 200 proceeds to block 210. Also if the user configures the card to be always on, the security level associated with the user or the device 102 may be reconfigured to a third electronic wallet security level. In an embodiment, configuring a transit card to be always on does not cause the electronic wallet security level to be reconfigured.

While several different methods of configuring security levels of electronic wallets and associated electronic payment flows have been discussed above, it will be readily appreciated that many other variations of electronic payment flows and wallet security level state transitions are possible, all of which are contemplated by the present disclosure.

Figure 5:
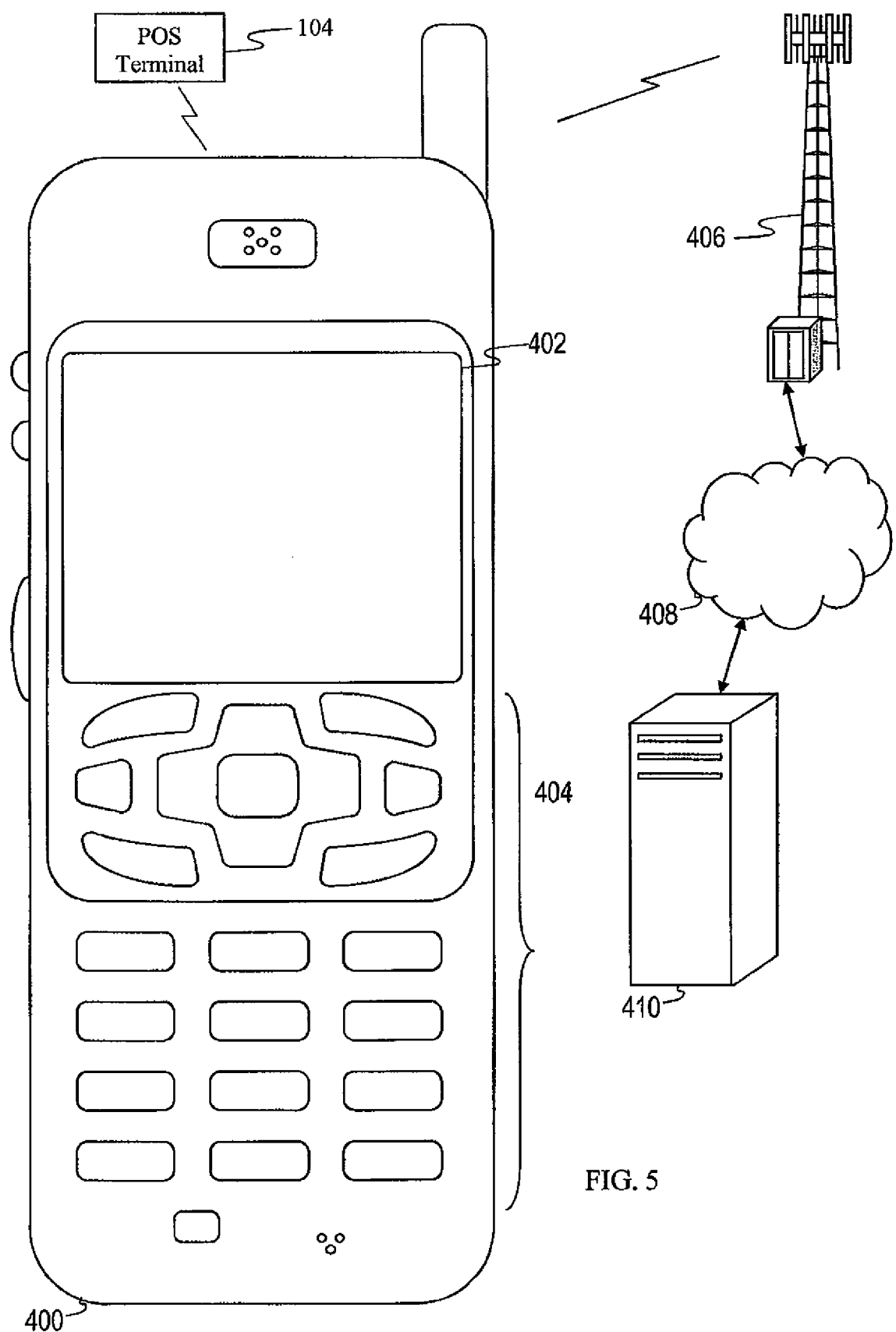
FIG. 5 is an illustration of a handset communicating with a payment system according to an embodiment of the disclosure.

FIG. 5 shows a wireless communications system including a handset 400. FIG. 5 depicts the handset 400, which is operable for implementing aspects of the present disclosure, for example the portable electronic device 102, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized work assignments such as inventory control, job control, and/or task management functions.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400.

The handset 400 may execute a web browser application which enables the display 402 to show a web page. The web page may be obtained via wireless communications with a cell tower 406, a wireless network access node, a peer handset 400 or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 402. Alternately, the handset 400 may access the cell tower 406 through a peer handset 400 acting as an intermediary, in a relay type or hop type of connection. The handset 400 may conduct payment transactions using contactless communications means with the POS terminal 104, for example using a contactless communication transceiver (not shown).

Figure 6:
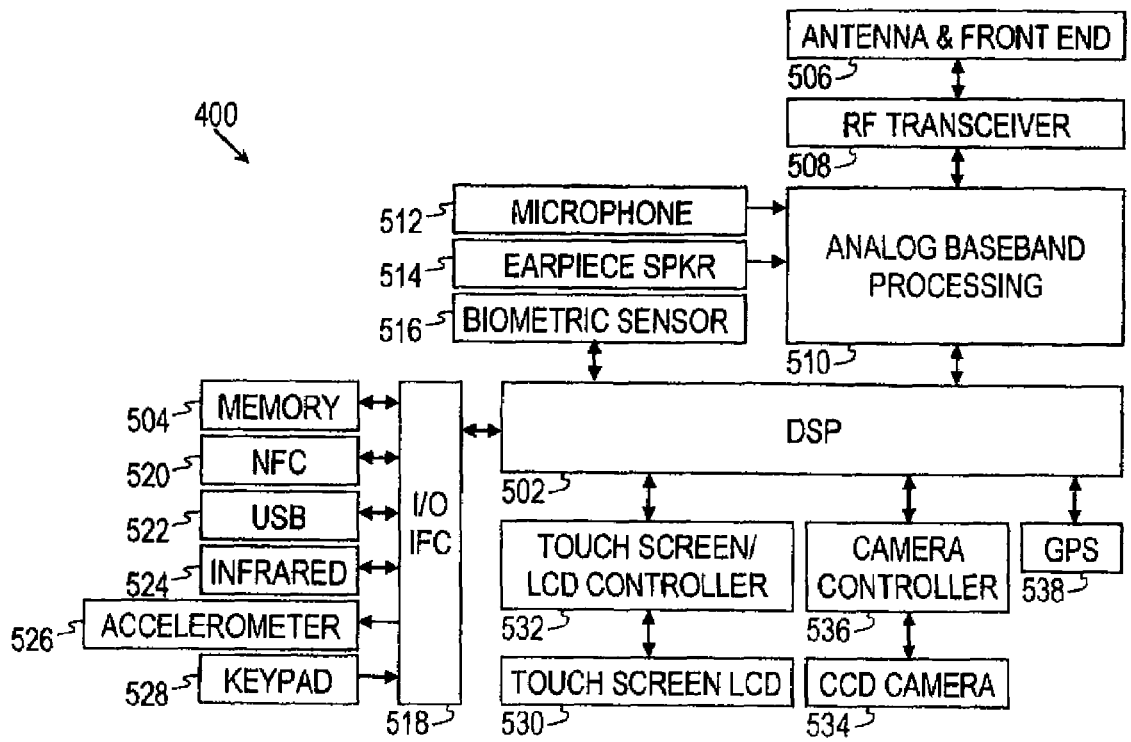
FIG. 6 is a block diagram of a handset according to an embodiment of the disclosure.

FIG. 6 shows a block diagram of the handset 400. While a variety of known components of handsets 400 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a biometric sensor 516, an input/output interface 518, a near field communication (NFC) transceiver card or other contactless communication transceiver 520, a universal serial bus (USB) port 522, an infrared port 524, an accelerometer or other transducer 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like a removable memory card (not shown) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In an embodiment, the antenna and front end unit 506 may include multiple antennas whereby to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity the description here separates the description of this signal processing from the RF and/or radio stage and conceptually allocates that signal processing to the analog baseband processing unit 510 and/or the DSP 502 or other central processing unit. In some embodiments the RF transceiver 508, portions of the antenna and front end 506, the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and outputs to the earpiece speaker 514. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending and for a receiver function the DSP 502 may perform cyclic prefix removal, fast fourier transforming, deinterleaving, decoding, and demodulation. In other wireless technology applications yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card (not shown) may provide software and data to configure the operation of the DSP 502. Among the interfaces may be the NFC transceiver card 520, the USB port 522, and the infrared port 524. The NFC transceiver card 520 may promote communications between the handset 400 and the POS terminal 104. The USB port 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the biometric sensor 516 and to the accelerometer 526. The biometric sensor 516 may detect various biometric characteristics or signatures of a user and provide appropriate biometric input to the DSP 502 or other processor. The accelerometer 526 may serve as a mechanism to sense distinctive movements of the handset 400 and to provide appropriate motion input to the DSP 502 or other processor. In an embodiment, a different transducer may be employed to detect and/or sense distinctive movements of the handset 400.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology different from Charge Coupled Device cameras may be employed. Various other peripherals may also be included to provide additional functions, e.g., radio and television reception.

Figure 7:
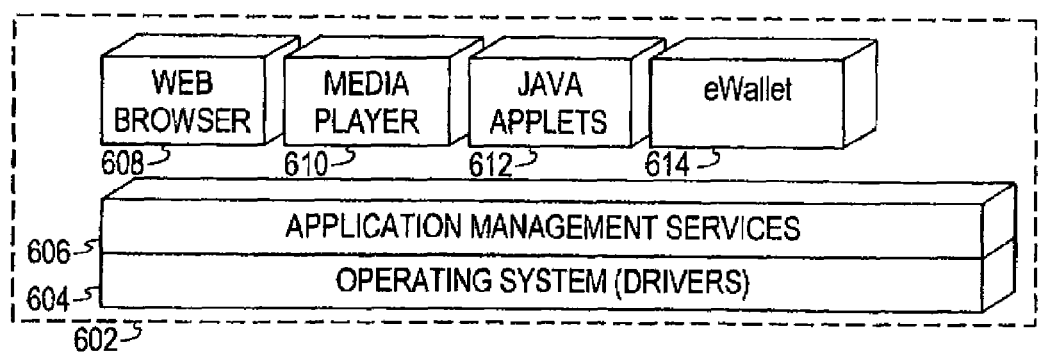
FIG. 7 is an illustration of a software architecture of a handset according to an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 7 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality. An eWallet application 614, substantially similar to the electronic wallet 110, is also shown in FIG. 7. The software environment 602 may include other applications (not shown) including a VPN application, a spreadsheet application, an address book application, a scheduler application, a contact list application, and/or other applications.

Figure 8:
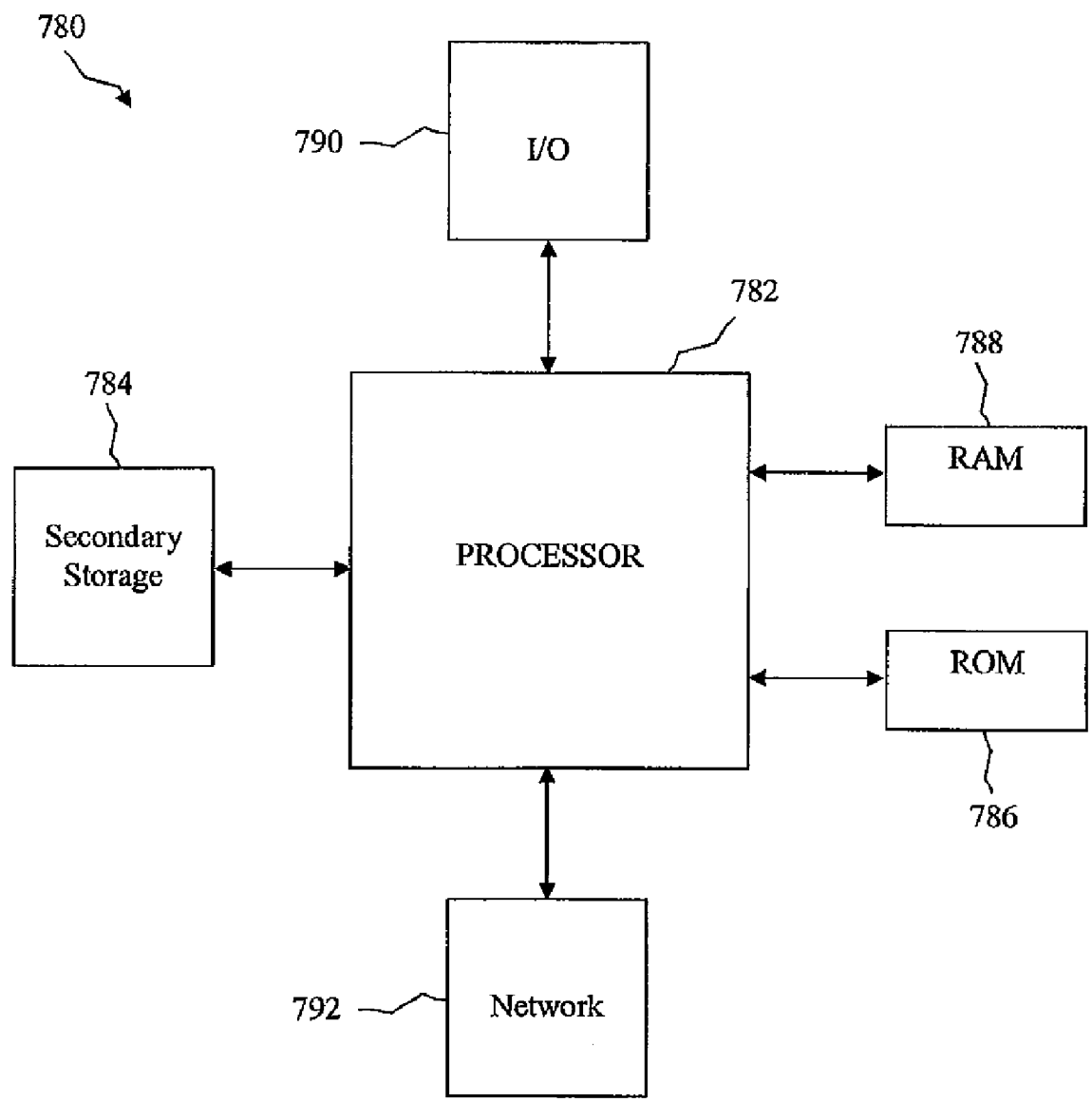
FIG. 8 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of completing a payment transaction using an electronic wallet on a portable device, comprising:
  storing, by the electronic wallet stored in a memory of the portable device and being executed by a processor of the mobile device, multiple payment cards, wherein the electronic wallet has first, second, and third user configured levels of electronic wallet security for providing payment information to complete a transaction when the portable device is active;
  responsive to receiving, by the electronic wallet, a third set of selections from a user, executing the electronic wallet at the third level of electronic wallet security, wherein the third set of selections comprises a selection for a payment card to remain on, and wherein the third level of electronic wallet security comprises providing payment information without launching the electronic wallet and without requiring a PIN input to complete the payment transaction;
  responsive to receiving, by the electronic wallet, a second set of selections from a user, executing the electronic wallet at the second level of electronic wallet security, wherein the second set of selections comprises a selection for remembering the PIN, and wherein the second level of electronic wallet security comprises providing payment information by launching the electronic wallet without requiring the PIN input to complete the payment transaction;

responsive to receiving, by the electronic wallet, a first set of selections from a user or responsive to a first initialization of the electronic wallet, executing the electronic wallet at the first level of electronic wallet security, wherein the first level of electronic wallet security comprises providing payment information by launching the electronic wallet and requiring the PIN input to complete the payment transaction; and providing, by the electronic wallet, payment information to complete the payment transaction based on a current level of user configured electronic wallet security.

2. The method of claim 1, further including:

reconfiguring the electronic wallet from the first level of electronic wallet security to the second level of electronic wallet security responsive to receiving the second set of selections from a user; and reconfiguring the electronic wallet from the second level of electronic wallet security to the third level of electronic wallet security responsive to receiving the third set of selections from a user, wherein the payment card selected to remain on is not a transit card.

3. The method of claim 1, wherein the portable device is one of a mobile phone and a personal digital assistant.

4. The method of claim 3, wherein the providing payment information to complete the payment transaction for the first, second, and third levels of wallet includes contactless communication with a point-of-sale terminal.

5. The method of claim 4, wherein the contactless communication is based on near field communication (NFC) technology.

6. The method of claim 1, wherein requiring the PIN input to complete the payment transaction comprises prompting for and receiving input of the PIN responsive to initiating a payment with a payment card contained by the electronic wallet.

7. The method of claim 1, wherein requiring the PIN input to complete the payment transaction comprises prompting for and receiving input of the PIN responsive to launching the electronic wallet.

8. The method of claim 1 further including:

launching a dynamic set up interface with selectable options responsive to the level of security of the electronic wallet, wherein launching the dynamic set up interface for the first level of electronic wallet security provides a selectable option of the second set of selectable options for remembering the PIN to configure the electronic wallet for the second level of security, wherein launching the dynamic set up interface when the electronic wallet is configured for the second level of electronic wallet security provides a selectable option of the third set of selectable options for a payment card to remain on to configure the electronic wallet for the third level of security.

9. The method of claim 8 wherein the multiple payment cards comprise a plurality of credit cards, a plurality of debit cards, a plurality of transit cards, or combinations thereof.

10. The method of claim 9 wherein only a single payment card that is not a transit card is allowed to be made to remain on.

11. The method of claim 9 wherein a plurality of transit cards are allowed to be made to remain on.

12. The method of claim 1 wherein the first initialization of the electronic wallet comprises the electronic wallet having no payment card set up.

13. The method of claim 1 wherein the electronic wallet comprises a plurality of payment cards having different levels of security.

14. The method of claim 1 further comprising: adding a new payment card to the electronic wallet; and automatically configuring a security level of the new payment card to the current user configured level of electronic wallet security.

* * * * *